Patented Sept. 20, 1938

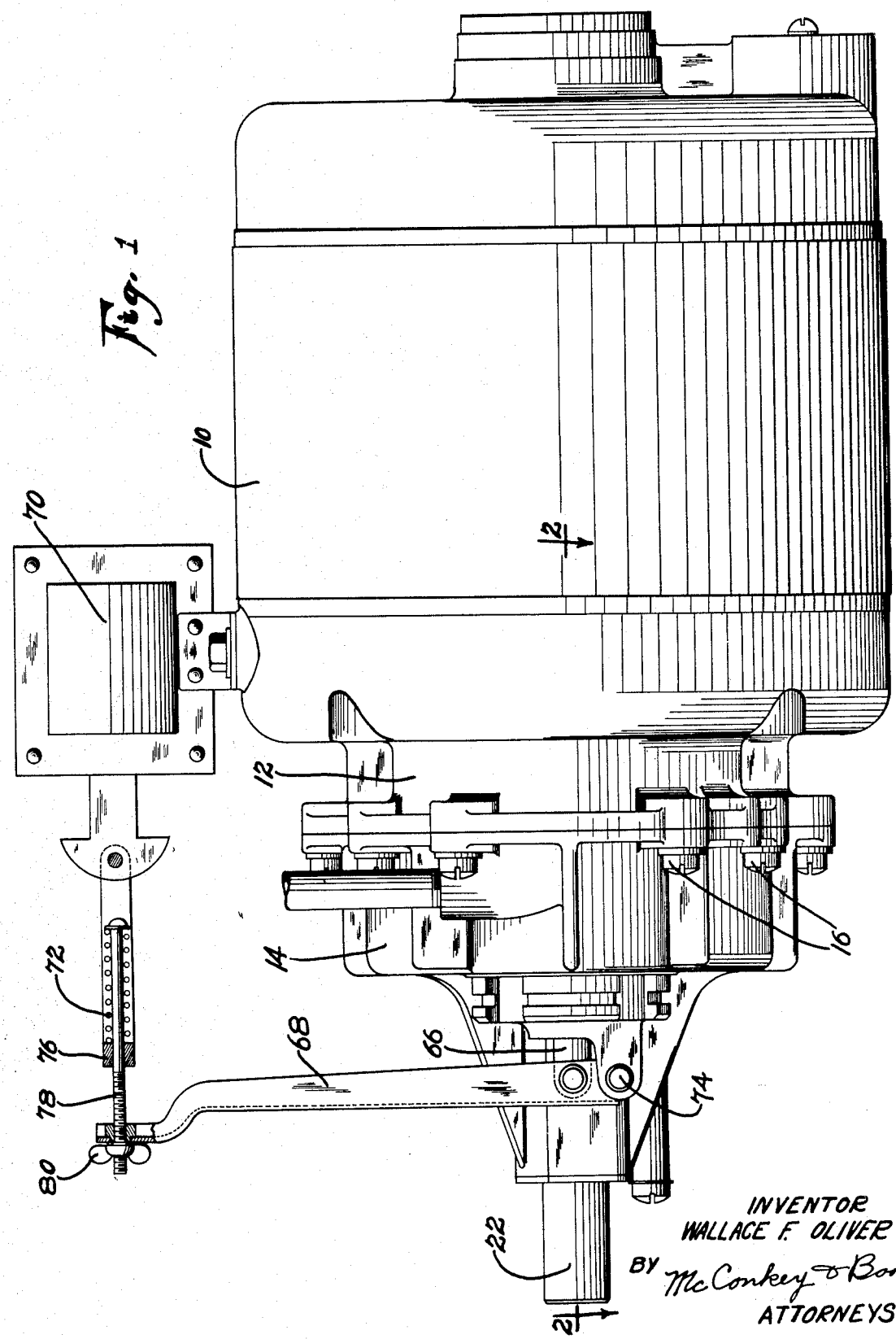

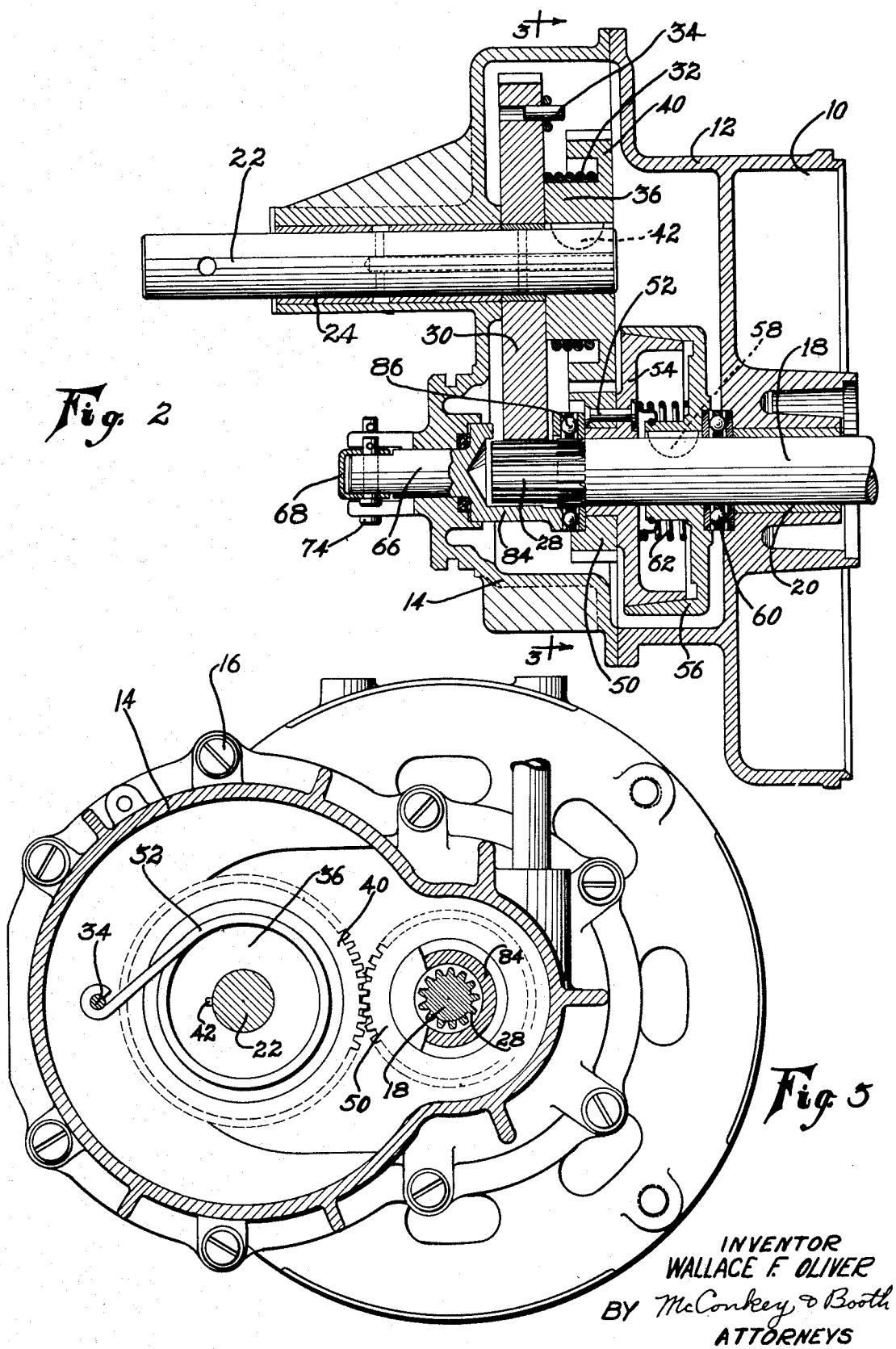

2,130,855

UNITED STATES PATENT OFFICE 2,130,855

TRANSMISSION

Wallace F. Oliver, Detroit, Mich., assignor to Bendix Home Appliances, Inc., South Bend, Ind., a corporation of Delaware Application July 12, 1937, Serial No. 153,126

6 Claims. (Cl. 74—368)

This invention relates to transmissions, and is illustrated as embodied in a two-speed motor-transmission unit for driving a washing machine. An object of the invention is to provide a compact and reliable mechanism adapted for economical mass-production manufacture, and in which changes of speed take place smoothly and without shock.

Various features of novelty relate to the construction and arrangement of the various gears and shafts of the transmission, and the high-speed clutch and its operating means, to secure the desired compactness of arrangement with effective operation; and these and other features and additional objects of the invention will be apparent from the following description of the illustrative embodiment shown in the accompanying drawings, in which:

Figure 1 is a side elevation of the entire motor-transmission unit;

Figure 2 is a section through the transmission part of the unit on the line 2—2 of Figure 1; and Figure 3 is a section through the transmission on the line 3—3 of Figure 2.

The drive unit shown in Figure 1 includes a suitable motor 10, the end of the housing of which is formed as one part 12 of a housing for the transmission described below, the other part 14 of the transmission housing being secured thereto by suitable fastenings 16. The armature shaft 18 extends into the housing 12—14, and serves as a drive shaft for the transmission; it is shown provided with a bearing 20 in the motor housing wall.

The driven shaft of the transmission is a countershaft 22 paralleling the drive shaft 18, and having a bearing 24 in a boss formed in part 14 of the housing, opposite the motor 10. This shaft may be connected in any desired manner to drive a machine at either high or low speeds. For example, it may be so connected to drive the washing machine described in application No. 129,429, filed March 9, 1937, by Rex Earl Bassett, Jr. and John W. Chamberlin.

The drive shaft is provided at its end with pinion teeth 28, shown as cut integrally on the end of the shaft, and meshing with a large gear 30 loose on the countershaft 22 to give low-speed drive.

The gear 30 has a one-way drive connection with shaft 22, so that the shaft may over-run the gear during high-speed drive. For example, a clutch spring 32 is shown anchored to the gear 30 by means such as a pin 34, and as encircling a cylindrical boss 36 formed on one side of a small gear 40 fixed on the end of the countershaft 22, as for example by a key 42.

The clutch spring 32 has a slight drag on the boss 36 when the shaft 22 is over-running the gear 30, which tends to open up the coils of the spring. When gear 30 is driving the shaft 22, the coils 32 tighten and firmly grip the boss 36.

The small gear 40 meshes with a gear 50 loose on the drive shaft 18 between the pinion teeth 28 and the motor 10. The gear 50 is connected, for example by rivets 52, to a male cone clutch member 54 also loose on the shaft 18, the gear 50 and clutch member 54 being shiftable axially of the shaft 18 to cause the cone clutch member 54 to engage a female cone clutch member 56 fixed on the shaft 18 by means such as a key 58, and which is preferably backed up by a thrust ball bearing 60 engaging the end wall of the motor housing. A spring 62 compressed between the two clutch members normally holds them apart in disengaged position, with the transmission in low.

A shift plunger device 66, in alinement with the shaft 18, is mounted for axial sliding movement in the transmission casing part 14. This may be operated by any suitable means, for example by a clutch lever 68 operated by a solenoid 70 or the like, the operation preferably being a yielding one through a spring 72 when the clutch is being engaged.

The solenoid is shown mounted on the housing of the motor 10, and the lever 68 as fulcrumed on a pivot 74 carried by spaced lugs formed on the housing section 14. The spring 72 is shown compressed between a lug 76 on the end of the solenoid core, and the head of a connecting rod 78 passing through the lug 76 and through the end of the lever 68 and connected to the latter by a nut 80 which can be tightened or loosened to adjust the clutch.

The plunger 66 is formed with a hollow part 84 which surrounds the end of the shaft 18, and which is cut away at one side to clear the large gear 30, and which engages the face of gear 50 opposite the motor, preferably through a thrust ball bearing 86.

In operation, during low speed operation the clutch 54—56 is held disengaged by the spring 62, the solenoid 70 being de-energized. The drive is then from the pinion teeth 28 to the gear 30 and thence through the clutch spring 32 and the gear 40 to the shaft 22, the gear 50 turning idly upon the shaft 18.

When the solenoid 70 is energized, to give high speed, the lever 68 shifts the shift plunger 66 to the right (Figure 2) to cause engagement of the clutch members 54 and 56. The drive is then from the shaft 18 through the clutch 56—54 and the gear 50 to the gear 40 and the shaft 22, the gear 30 being then over-run by the shaft 22.

While one illustrative embodiment has been described in detail, it is not my intention to limit the scope of my invention to that particular embodiment, or otherwise than by the terms of the appended claims.

I claim:

1. A transmission comprising a drive shaft having pinion teeth at its end, a countershaft paralleling the drive shaft, a small gear fixed on the countershaft, a large gear mounted on the countershaft and having a one-way drive through which it can drive the countershaft but which is not driven by the countershaft and which meshes with the pinion teeth on the end of the drive shaft, a clutch member fixed on the drive shaft a short distance from its end, a gear loose on the drive shaft meshing with said small gear and provided with a second clutch member engageable with the first clutch member, and a plunger device alined with and surrounding the end of the drive shaft and movable axially of the drive shaft to force the second clutch member against the first clutch member and which is cut away at one side to clear said large gear.

2. A transmission comprising a drive shaft having pinion teeth at its end, a countershaft paralleling the drive shaft, a small gear fixed on the countershaft, a large gear mounted on the countershaft and having a one way drive through which it can drive the countershaft but which is not driven by the countershaft and which meshes with the pinion teeth on the end of the drive shaft, a clutch member fixed on the drive shaft a short distance from its end, a gear loose on the drive shaft meshing with said small gear and provided with a second clutch member engageable with the first clutch member, and a plunger device alined with and surrounding the end of the drive shaft and provided with a thrust bearing engaging the face of the loose gear and movable axially of the drive shaft to shift the loose gear along the drive shaft without disengaging it from said small gear to force the second clutch member against the first clutch member and which plunger device is cut away at one side to clear said large gear.

3. A transmission having a drive shaft provided in sequence with a clutch member fixed thereon, a cooperating clutch member normally disengaged therefrom and loose on the shaft, and a gear loose on the shaft and attached to the cooperating clutch member, said shaft having pinion teeth at its end, and being provided with a clutch operating plunger device alined with the drive shaft and having a portion cut away at one side and enveloping the end of the drive shaft and having thrust engagement with the side of the loose gear, in combination with a countershaft paralleling the drive shaft and having fixed thereon a small gear meshing with said loose gear and having loose thereon a large gear meshing with the pinion teeth through the cut-away side of said plunger device, said large gear having associated therewith means for driving the countershaft in one direction only comprising one-way drive means.

4. A transmission having a drive shaft provided with a clutch member fixed thereon, a cooperating clutch member normally disengaged therefrom and movable axially on the shaft, and a gear loose on the shaft and drivably connected to the cooperating clutch member, said shaft being provided with pinion teeth, together with a clutch operating device having a portion formed to clear the end of the drive shaft and having thrust engagement with the side of the loose gear, in combination with a countershaft paralleling the drive shaft and having fixed thereon a small gear meshing with said loose gear and having loose thereon a large gear meshing with the pinion teeth, said large gear having associated therewith one-way drive means engaging the fixed small gear and through which the loose large gear can drive the countershaft.

5. A drive unit comprising a motor having at one end a transmission housing and having a shaft driven by the motor and extending into said housing, said shaft having pinion teeth at its end within said housing, cooperating cone clutch members one fixed and one loose on the shaft between the pinion teeth and the motor, means extending through the housing in alinement with said shaft and operable to cause engagement and disengagement of said cone clutch members, a countershaft paralleling the drive shaft and extending through the wall of the housing opposite the motor, a large gear meshing with said pinion teeth and having a one-way drive connection for driving the countershaft at low speed and permitting the countershaft when driven at a higher speed to overrun the large gear, and gears driven by said loose clutch member for driving the countershaft from the drive shaft at high speed with the countershaft over-running the large gear when the cone clutch members are engaged.

6. A drive unit comprising a motor having secured thereto a transmission housing and having a shaft driven by the motor and extending into said housing, said shaft having pinion teeth at its end within said housing, cooperating cone clutch members one fixed and one loose on the shaft between the pinion teeth and the motor, means extending through the housing and operable to cause engagement and disengagement of said cone clutch members, a countershaft paralleling the drive shaft and extending through the wall of the housing opposite the motor, a large gear meshing with said pinion teeth and having a one-way drive connection for driving the countershaft at low speed and permitting the countershaft when driven at a higher speed to overrun the large gear, and gears driven by said loose clutch member for driving the countershaft from the drive shaft at high speed with the countershaft over-running the large gear when the cone clutch members are engaged.

WALLACE F. OLIVER.